Oct. 9, 1956  J. R. HOLLINS  2,766,344
SELF-CANCELLING DIRECTIONAL SIGNAL DEVICE
Filed March 21, 1952  2 Sheets-Sheet 1

INVENTOR.
Jesse R. Hollins
BY
his ATTORNEY

Oct. 9, 1956  J. R. HOLLINS  2,766,344
SELF-CANCELLING DIRECTIONAL SIGNAL DEVICE
Filed March 21, 1952  2 Sheets-Sheet 2

INVENTOR.
Jesse R Hollins
BY
ATTORNEY

United States Patent Office 2,766,344
Patented Oct. 9, 1956

2,766,344

SELF-CANCELLING DIRECTIONAL SIGNAL DEVICE

Jesse R. Hollins, Brooklyn, N. Y.

Application March 21, 1952, Serial No. 277,803

9 Claims. (Cl. 200—61.37)

This invention relates to a switch for use with vehicle directional and emergency signalling lamp systems, and, more particularly, to novel means for restoring an operated directional signalling switch to neutral.

Automotive directional signalling switches, of the type to which the present invention is directed, are conveniently mounted on the steering post preferably somewhat below the steering wheel. They include projecting operating handles which may be moved in either direction from a neutral position to selectively signal either a right turn or a left turn. For this purpose, the operating handle is operatively associated with a switch mechanism arranged, upon operation of the handle to either signalling system, to light and preferably "flash" signal lamps on the corresponding side of the vehicle. In one arrangement, the parking and tail lamps are used for signalling purposes, burning steadily when the switch is in "neutral" and being selectively flashed when the switch is operated.

In order to assure cancellation of the turn signal when a predetermined degree of turn has been completed, the directional switches are generally provided with cancelling arrangements operable to restore the switch to neutral when the rotation of the steering wheel is reversed following completion of the turn. One known cancelling arrangement comprises cooperating cam surfaces carried by the steering wheel shaft and the switch and inoperative during turning movement of the shaft in the indicated turn direction. When the shaft movement is reversed, the cam surfaces operate to restore the switch to neutral. While this arrangement is effective in practice, it is relatively complicated and expensive in construction.

Another known cancelling arrangement involves a friction element, such as a friction wheel, mounted on a tilting shaft and engaged with the steering wheel shaft when the switch is operated to either selected position. When the steering shaft is turned in the indicated direction, the friction element is inactive to cancel the indication. However, when the steering shaft movement is reversed, the friction element is operated to disengage the steering shaft and restore the switch to neutral. Due to the tilting mounting of the shaft carrying the friction element, this arrangement is likewise rather complicated and relatively expensive.

The present invention is directed to an improved simplified and inexpensive cancelling device of the friction element type, and in which a friction wheel is rotatably supported on a slide guided for longitudinal reciprocation in guideways cooperably formed by the two halves of the usual switch housing. Spring means bias the slide to a position retracting the wheel from engagement with the steering shaft and into continuous engagement with friction rollers carried in the extremities of a Y yoke oscillatable with the switch selector lever which forms an extension of the yoke stem. When the selector lever is operated, one or the other of the rollers forces the wheel into engagement with the steering shaft, the mounting slide being moved outwardly. When the shaft is turned in the indicated direction, the frictional reaction on the yoke roller is such as to maintain the yoke and selector lever biased in the operated direction. When the shaft movement is reversed, the frictional drive on the yoke roller snaps the yoke to the neutral position allowing the springs to retract the slide and the friction wheel.

For an understanding of the invention principles, reference is made to the following detailed description of a typical embodiment thereof as illustrated in the accompanying drawings. In the drawings.

While the invention indication-cancelling arrangement is generally useful with any type of steering post mounted switch, it is particularly adapted for use with the directional switch shown, described and claimed in my copending application, now matured as Patent No. 2,607,840, dated August 19, 1952, for "Emergency Stop Flasher Signal System."

The switch and signalling arrangement of such copending application uses the vehicle parking and stop lamps for signalling purposes and includes a plate or operator manually biased to move in synchronism with the selector lever. Upon relative movement between such operator and the lever, in any position of the lever, all the signal lamps are flashed simultaneously to indicate an emergency stop or emergency parking. As the circuit closure details of this switch are fully shown and described in my copending application, they are omitted from the present disclosure as they are not pertinent to the novel features of the present invention.

Figure 1:
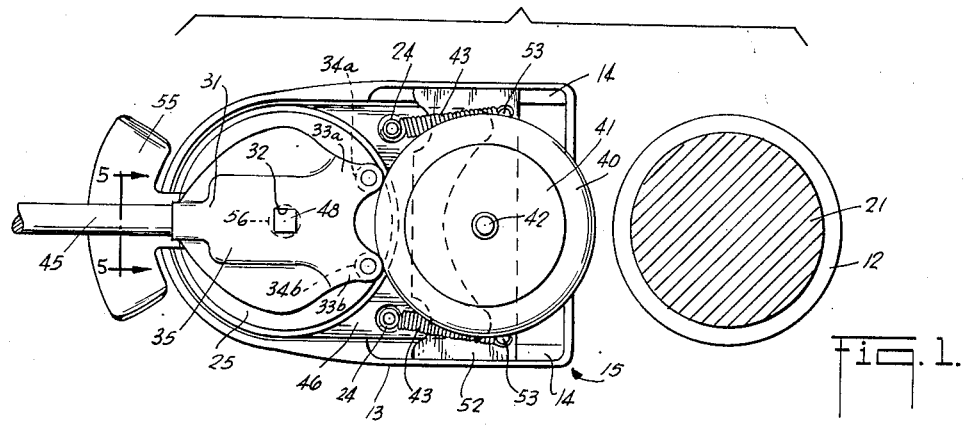
Fig. 1 is a substantially horizontal sectional view through a direction signalling switch embodying the invention, showing the steering shaft, the switch being in the neutral position.
Figure 2:
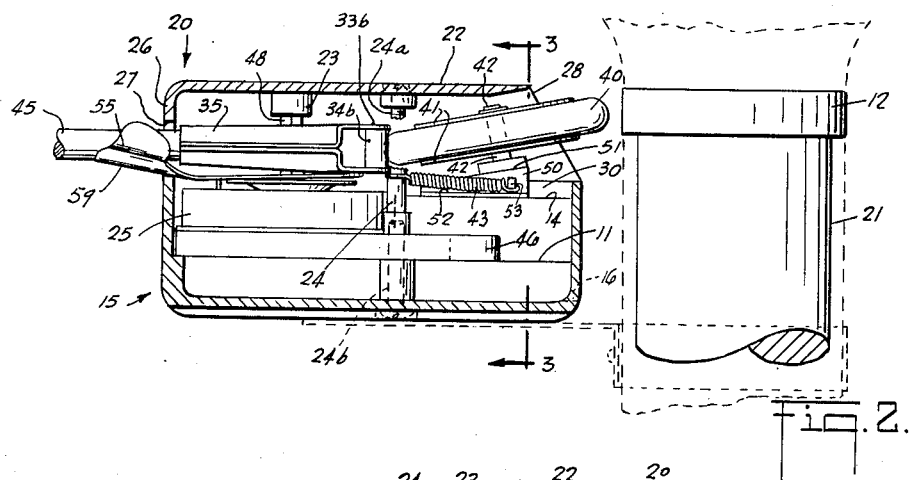
Fig. 2 is a longitudinal sectional view of the switch in a plane perpendicular to the plane of Fig. 1.
Figure 3:
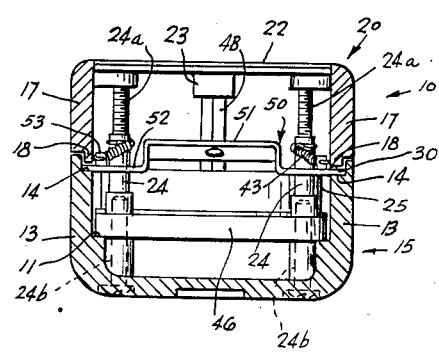
Fig. 3 is a transverse sectional view on the line 3—3 of Fig. 2.

Referring to Figs. 1, 2 and 3, a circuit closure arrangement of the type shown and described in said copending application is enclosed within a casing 25 mounted on a bracket or plate 46, the polygonal cross section operating shaft 48 of the circuit closure extending outwardly from casing 25. Plate 46 is supported on ledges 11 in the lower half 15 of a two-part housing 10. The latter is secured by a suitable separable clamp arrangement (shown in dotted lines) to a steering post (shown in dotted lines) enclosing the steering shaft 21 of the vehicle. Shaft 21 may have a bearing ring 12 secured therearound at the switch housing location. For a purpose to be described, the side walls 13 of housing section 15 are formed with recessed ledges 14 in their outer edges adjacent the inner or steering post end of housing 10, which end has slot 16 for the switch leads.

Housing 10 is completed by an upper half 20 complementary to lower half 15. Housing half 20 has side walls 17 arranged to mate with side walls 13 and having flanges or ribs 18 arranged to extend toward ledges 14. However, ribs 18 are spaced from ledges 14 to provide guideways 30 for a purpose to be described. The outer wall 22 of section 20 has a bearing 23 on its inner surface receiving the end of shaft 48 when the sections are assembled. The sections are held together by screw 24a extending through apertures in cover section 20 and threaded into recesses at one end of post 24 resting on the plate 46 in the base 15, said post being maintained in rigid position by screw 24b threaded into recesses at the other end of post 24a.

Figure 5:
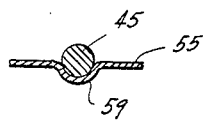
Fig. 5 is a sectional view on the line 5—5 of Fig. 1, with the friction wheel and yoke removed.

The outer end wall 26 of cover section 20 is formed with a laterally extended aperture 27 through which extends the selector lever 45 and the "emergency flashing" operator 55. As best seen in Fig. 5, the latter is generally flat with a radial groove 59 receiving lever 45. Engagement of lever 45 in groove 59 normally biases plate 55 to move with lever 45, but the plate may be moved angularly relative to lever 45, in either direction and in any position of lever 45, to provide the "emergency" flashing of all the signalling lamps. A portion of outer wall 22 of cover section 20 is cut away as at 28 and the inner wall of the section is omitted for a purpose to be described.

Operator or plate 55 has a circular hole 56 receiving shaft 48 so that movement of plate 55 will not rotate shaft 48. In the present instance, lever 45 is not secured directly to shaft 48 but is mounted in the stem 31 of a two-part Y yoke 35 having a polygonal aperture 32 closely embracing shaft 48. Each of arms 33a and 33b of yoke 35 respectively carries friction rollers 34a and 34b.

These laterally spaced friction rollers continuously engage a friction wheel 40 comprising a rubber roller held between washers 41, 41 and rotatable on a shaft 42. The latter extends upwardly and outwardly in perpendicular relation to the sloping offset upper surface 51 of a slide 50 having flanges 52 riding in the guideways 30. Wheel 40 thus extends upwardly and inwardly toward shaft 21, and is aligned with ring 12. Springs 43, 43 extending between bolts 24 and pins 53, 53 on slide 50 bias slide 50 outwardly to hold wheel 40 continuously engaged with rollers 34a and 34b and manually out of engagement with ring 12.

Figure 4:
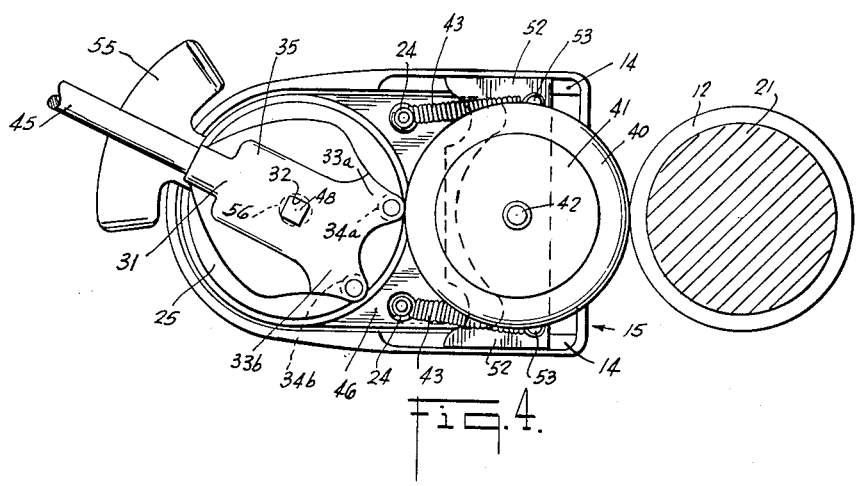
Fig. 4 is a view similar to Fig. 1 illustrating the switch operated to indicate a right turn.

The operation of the cancelling arrangement will be best understood from Figs. 1 and 4. When the switch is in the neutral position, wheel 40 is retracted from ring 12 as shown in Fig. 1 and nests between rollers 34a and 34b. To indicate a right turn, selector lever 45, carrying plate 55 with it, is swung clockwise to the position of Fig. 4. This operates circuit closure 25 to flash the indicator lamps on the right side of the vehicle. Yoke 35 is correspondingly swung so that the roller 34a (Figs. 1 and 4) forces wheel 40 and slide 50 outwardly. Wheel 40 is thus frictionally engaged with ring 12 and with roller 34a, being out of engagement with roller 34b.

When shaft 21 is turned clockwise to make the right turn, wheel 40 is rotated counter-clockwise. Thus, the frictional force on the engaged roller 34a, is such as to bias yoke 35 clockwise, maintaining the switch in the operated position. When the turning movement of the vehicle is completed, shaft 21 is rotated counter-clockwise to straighten the vehicle steering wheels. Correspondingly, friction wheel 40 is rotated clockwise and, through the engaged roller 34a, yoke 35 is biased counter-clockwise. This snaps the switch to the intermediate or neutral position, due to the biasing force of springs 43 on slide 50 pulling wheel 40 toward yoke 35.

On an indicated left turn, the cancelling arrangement operates in a corresponding manner, except that the selector lever 45 is swung counter-clockwise and displacement of wheel 40 is effectuated by roller 34b. The cancancelling arrangement comprises a few simple parts, simply arranged and related. The parts are easily assembled by securing springs 43 in place on the post 24, placing flanges 52 onto ledges 14, and then placing cover section 20 in place and fastening it to base section 15 by threading screws 24a and 24b into the opposing recesses of post 24.

While a specific embodiment of the invention has been shown and described in detail to illustrate the application of the invention principles, it will be understood that the invention may be embodied otherwise without departing from such principles.

What is claimed is:

1. In a turn indicating switch adapted to be mounted on the steering post of a vehicle and operated by rotation of the steering shaft within such post, a support adapted to be fixed relative to the steering post, a switch operating lever selectively oscillatable on said support from a neutral position to either of a pair of settable turn indicating positions, a slide mounted on said support for longitudinal reciprocation relative to the steering shaft, a friction element rotatably mounted on said slide for engagement with the steering shaft when said slide is moved towards the steering shaft, means normally biasing said slide to a position in which said element is disengaged from the shaft, a friction roller mounted on said lever between the oscillation axis thereof and the axis of rotation of said element and continuously and frictionally engaged peripherally with said element, said roller being out of line with said axes in the neutral position of said lever and substantially aligned therewith in a settable position of said lever, whereby, as said lever is oscillated to a settable position, said roller will move said element outwardly to engage the steering shaft against the bias on the slide, said shaft, in turning to correspond with the selected turn indication, rotating said roller through said element in a direction to maintain said alignment and, in turning in the reverse direction, rotating said element in a direction to move said roller toward the neutral position of said lever.

2. In a turning indicating switch adapted to be mounted on the steering post of a vehicle and operated by rotation of the steering shaft within such post, a support adapted to be fixed relative to the steering post, a switch operating lever selectively oscillatable on said support from a neutral position to either of a pair of settable turn indicating positions, a slide mounted on said support for longitudinal reciprocation relative to the steering shaft, a friction wheel rotatably mounted on said slide for engagement with the steering shaft when said slide is moved towards the steering shaft, means normally biasing said slide to a position in which said wheel is disengaged from the shaft, a friction roller mounted on said lever between the oscillation axis thereof and the axis of rotation of said wheel and continuously and frictionally engaged peripherally with said wheel, said roller being out of line with said axes in the neutral position of said lever and substantially aligned therewith in a settable position of said lever, whereby, as said lever is oscillated to a settable position, said roller will move said wheel outwardly to engage the steering shaft against the bias on the slide, said shaft, in turning to correspond with the selected turn indication, rotating said roller through said wheel in a direction to maintain said alignment and, in turning in the reverse direction, rotating said wheel in a direction to move said roller toward the neutral position of said lever.

3. In a turning indicating switch adapted to be mounted on the steering post of a vehicle and operated by rotation of the steering shaft within such post, a support adapted to be fixed relative to the steering post, a switch operating lever selectively oscillatable on said support from a neutral position to either of a pair of settable turn indicating positions, a slide mounted on said support for longitudinal reciprocation relative to the steering shaft, a friction wheel rotatably mounted on said slide for engagement with the steering shaft when said slide is moved towards the steering shaft, means normally biasing said slide to a position in which said wheel is disengaged from the shaft, a yoke oscillatable with said lever and having a pair of diverging arms extending from the lever oscillation axis toward said wheel, and a pair of friction rollers each mounted in an end of said arms each in continuous and frictional peripheral engagement with said wheel, said rollers, in the neutral position of said lever, being substantially equidistant laterally from a line joining the lever and wheel axes, a selected one of said rollers being substantially within such line in either settable position of said lever, whereby, as said lever is oscillated to a settable position, one roller will move said wheel outwardly to engage the steering shaft against the bias on the slide, said shaft, in turning to correspond with the selected turn indication, rotating said one roller through said wheel in a direction to maintain said alignment and, in turning in the reverse direction, rotating said wheel in a direction to move said one roller toward the neutral position of said lever.

4. In a turning indicating switch adapted to be mounted on the steering post of a vehicle and operated by rotation of the steering shaft within such post, a support adapted to be fixed relative to the steering post, a switch operating lever selectively oscillatable on said support from a neutral position to either of a pair of settable turn indicating positions, a slide mounted on said support for longitudinal reciprocation relative to the steering shaft, a friction wheel rotatably mounted on said slide for engagement with the steering shaft when said slide is moved towards the steering shaft, means normally biasing said slide to a position in which said wheel is disengaged from the shaft, a friction roller mounted on said lever between the oscillation axis thereof and the axis of rotation of said wheel and continuously and frictionally engaged peripherally with said wheel, said roller being out of line with said axes in the neutral position of said lever and substantially aligned therewith in a settable position of said lever, whereby, as said lever is oscillated to a settable position, said roller will move said wheel outwardly to engage the steering shaft against the bias on the slide, said shaft, in turning to correspond with the selected turn indication, rotating said roller through said wheel in a direction to maintain said alignment and, in turning in the reverse direction, rotating said wheel in a direction to move said roller toward the neutral position of said lever, the plane of rotation of said wheel being at an acute angle to the plane of movement of said slide.

5. In a turning indicating switch adapted to be mounted on the steering post of a vehicle and operated by rotation of the steering shaft within such post, a support adapted to be fixed relative to the steering post, a switch operating lever selectively oscillatable on said support from a neutral position to either of a pair of settable turn indicating positions, a slide mounted on said support for longitudinal reciprocation relative to the steering shaft, a friction wheel rotatably mounted on said slide for engagement with the steering shaft when said slide is moved towards the steering shaft, means normally biasing said slide to a position in which said wheel is disengaged from the shaft, a yoke oscillatable with said lever and having a pair of diverging arms extending from the lever oscillation axis toward said wheel, and a pair of friction rollers each mounted in an end of said arms each in continuous and frictional peripheral engagement with said wheel, said rollers, in the neutral position of said lever, being substantially equidistant laterally from a line joining the lever and wheel axes, a selected one of said rollers being substantially within such line in either settable position of said lever, whereby, as said lever is oscillated to a settable position, one roller will move said wheel outwardly to engage the steering shaft against the bias on the slide, said shaft, in turning to correspond with the selected turn indication, rotating said one roller through said wheel in a direction to maintain said alignment and, in turning in the reverse direction, rotating said wheel in a direcon to move said one roller toward the neutral position of said lever, the plane of rotation of said wheel being at an acute angle to the plane of movement of said slide.

6. A switch as claimed in claim 5, in which said support comprises an enclosure formed of a pair of separable housing sections having cooperating side wall peripheries forming guideways for said slide.

7. A switch as claimed in claim 5, in which said support comprises an enclosure formed of a pair of separable housing sections, the side walls of one section having parallel ledges along their peripheries, said slide having flanges engaged in said ledges, the side walls of the other section having peripheral lips aligned with said ledges and overlying said flanges, and releasable means uniting said sections.

8. A switch as claimed in claim 5, in which said support comprises an enclosure formed of a pair of separable housing sections having cooperating side wall peripheries forming guideways for said slide, one of said sections having an opening and said wheel extending outwardly through the opening in said one section.

9. A switch as claimed in claim 5, in which said support comprises an enclosure formed of a pair of separable housing sections, the side walls of one section having parallel ledges along their peripheries, said slide having flanges engaged in said ledges, the side walls of the other section having peripheral lips aligned with said ledges and overlying said flanges, and releasable means uniting said sections, one of said sections having an opening and said wheel extending outwardly through the opening in said one section.

References Cited in the file of this patent

UNITED STATES PATENTS

| | | |
|---|---|---|
| 2,308,108 | Roedding | Jan. 12, 1943 |
| 2,596,440 | Sampson | May 13, 1952 |
| 2,604,560 | Dibelka | July 22, 1952 |
| 2,611,047 | Barcus | Sept. 16, 1952 |